United States Patent
Nonogaki et al.

(10) Patent No.: US 10,013,583 B2
(45) Date of Patent: Jul. 3, 2018

(54) ELECTRONIC DEVICE

(71) Applicant: KYOCERA Corporation, Kyoto-shi, Kyoto (JP)

(72) Inventors: Masatoshi Nonogaki, Daito (JP); Yuuko Aoki, Kyotanabe (JP)

(73) Assignee: KYOCERA Corporation, Kyoto (JP)

( * ) Notice: Subject to any disclaimer, the term of this patent is extended or adjusted under 35 U.S.C. 154(b) by 35 days.

(21) Appl. No.: 15/218,810

(22) Filed: Jul. 25, 2016

(65) Prior Publication Data
US 2017/0024587 A1    Jan. 26, 2017

(30) Foreign Application Priority Data
Jul. 24, 2015 (JP) .................. 2015-146417

(51) Int. Cl.
| | | |
|---|---|---|
| *G06F 21/88* | (2013.01) | |
| *G08B 21/24* | (2006.01) | |
| *G06F 1/18* | (2006.01) | |
| *G01L 9/00* | (2006.01) | |
| *H04M 1/00* | (2006.01) | |
| *H04W 52/02* | (2009.01) | |

(52) U.S. Cl.
CPC ............ *G06F 21/88* (2013.01); *G01L 9/0054* (2013.01); *G06F 1/182* (2013.01); *G08B 21/24* (2013.01); *H04M 1/00* (2013.01); *H04W 52/0251* (2013.01)

(58) Field of Classification Search
CPC ......... G01L 9/0054; G06F 1/182; G06F 1/26; G08B 21/24; G08B 21/81; H04R 29/001; G10K 11/18; H05K 5/06; H04W 52/0251
See application file for complete search history.

(56) References Cited

U.S. PATENT DOCUMENTS

| | | | | |
|---|---|---|---|---|
| 8,321,916 | B2 * | 11/2012 | Aissi ................... | G06F 21/6209 726/35 |
| 9,705,309 | B2 * | 7/2017 | Peng ..................... | H02H 5/083 |
| 9,733,144 | B2 * | 8/2017 | Miura ................... | G01L 19/149 |

(Continued)

FOREIGN PATENT DOCUMENTS

| | | | |
|---|---|---|---|
| GB | 02404305 A1 * | 7/2003 | ............ H04M 1/673 |
| JP | 2006-166360 A | 6/2006 | |

(Continued)

OTHER PUBLICATIONS

Office Action dated Jan. 31, 2017 issued by the Japan Patent Office in counterpart Japanese Patent Application No. 2015-146417 with concise explanation, 4 pages.

*Primary Examiner* — Eleni A Shiferaw
*Assistant Examiner* — Hee K Song
(74) *Attorney, Agent, or Firm* — Procopio Cory Hargreaves and Savitch LLP

(57) ABSTRACT

An electronic device of an aspect of the present disclosure includes an underwater detection unit and at least one processor. The underwater detection unit is configured to detect whether or not the electronic device is underwater. The at least one processor is configured to determine whether or not the electronic device has been lost when the underwater detection unit detects that the electronic device is underwater. The at least one processor is configured to determine that the electronic device has been lost when a predetermined condition is satisfied.

5 Claims, 7 Drawing Sheets

(56) References Cited

U.S. PATENT DOCUMENTS

| | | | |
|---|---|---|---|
| 2007/0254697 A1* | 11/2007 | Sugio | H04M 1/72538 455/556.2 |
| 2011/0074945 A1* | 3/2011 | Watanabe | H04N 5/232 348/81 |
| 2012/0146924 A1* | 6/2012 | Inoue | G06F 3/0418 345/173 |
| 2015/0009173 A1* | 1/2015 | Rodzevski | G06F 3/0414 345/174 |
| 2015/0022481 A1* | 1/2015 | Andersson | G06F 3/044 345/174 |
| 2015/0254962 A1* | 9/2015 | Lee | G08B 21/24 340/539.32 |
| 2016/0004283 A1* | 1/2016 | Ganguly | G06F 1/1656 307/118 |
| 2016/0146935 A1* | 5/2016 | Lee | G01S 15/02 367/87 |

FOREIGN PATENT DOCUMENTS

| | | |
|---|---|---|
| JP | 2009-188526 A | 8/2009 |
| JP | 2013-187585 A | 9/2013 |
| JP | 2015-156571 A | 8/2015 |

* cited by examiner

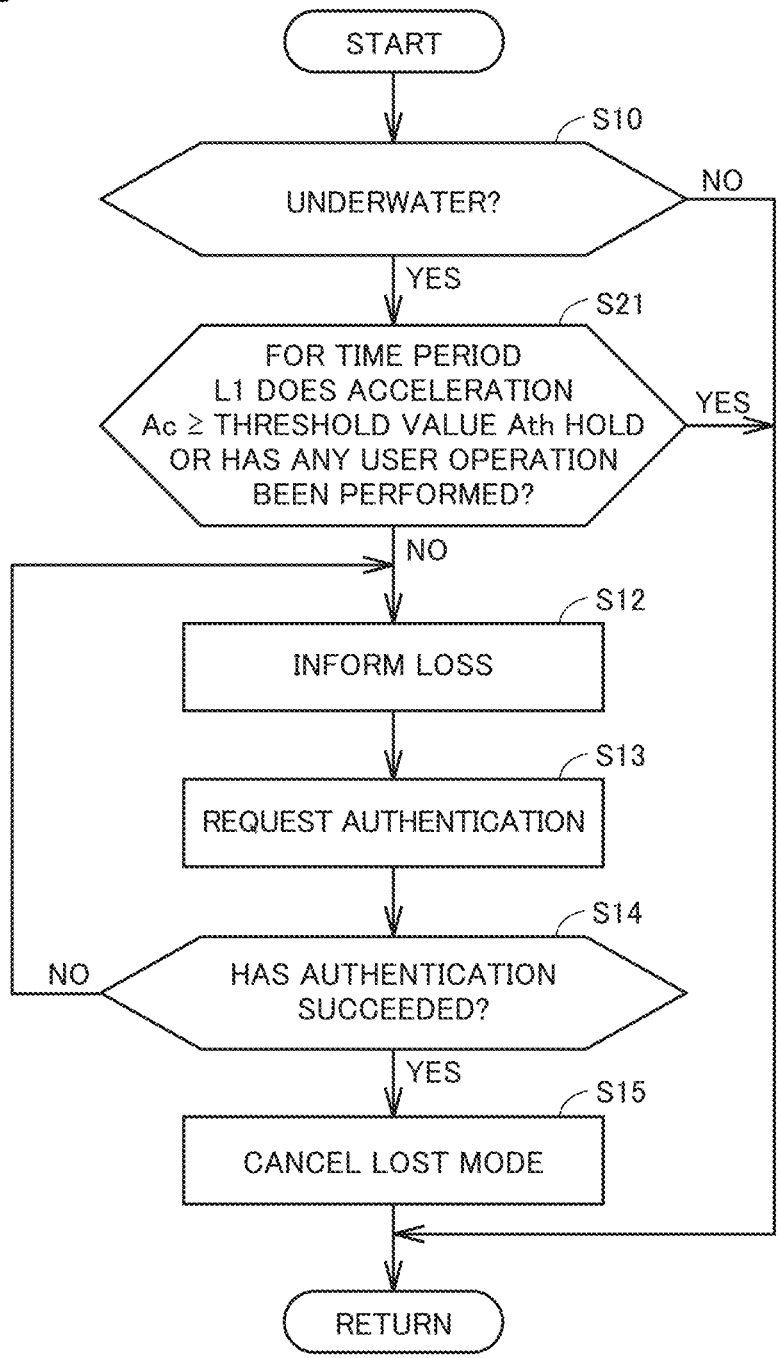

US 10,013,583 B2

ELECTRONIC DEVICE

CROSS-REFERENCE TO RELATED APPLICATION

The present application claims priority under 35 U.S.C. § 119 to Japanese Patent Application No. 2015-146417, filed on Jul. 24, 2015, entitled "Electronic Device." The content of which is incorporated by reference herein in its entirety.

FIELD

The present disclosure relates to an electronic device.

BACKGROUND

An electronic device which is usable underwater is conventionally known.

SUMMARY

An electronic device of an aspect of the present disclosure includes an underwater detection unit and at least one processor. The underwater detection unit is configured to detect whether or not the electronic device is underwater. The at least one processor is configured to determine whether or not the electronic device has been lost when the underwater detection unit detects that the electronic device is underwater. The at least one processor is configured to determine that the electronic device has been lost when a predetermined condition is satisfied.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is flowchart for illustrating the flow of a process of determining whether or not a smartphone which is an electronic device according to a second embodiment has been lost, which is performed in a controller of the smartphone.

DETAILED DESCRIPTION

Figure 1:
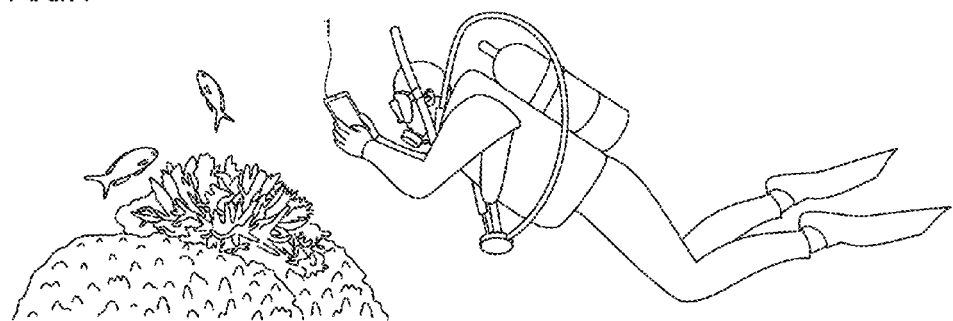
FIG. 1 shows a user taking a picture under the sea with a smartphone which is an electronic device according to a first embodiment.

Hereinafter, embodiments of the present disclosure will be described with reference to the drawings. In the drawings, the same or corresponding portions have the same reference characters allotted, and detailed description thereof will not be repeated.

First Embodiment

The following embodiments will describe a smartphone by way of example as an electronic device according to embodiments. An electronic device according to embodiments is not limited to a smartphone, but may be a tablet PC, a portable music player, a digital camera, a wearable terminal, or a wrist watch, for example.

FIG. 1 shows a user taking a picture under the sea with a smartphone 1 which is an electronic device according to a first embodiment. Smartphone 1 has a waterproof function. The user can carry smartphone 1 underwater as it is without requiring any additional case for preventing permeation of water.

Figure 2:
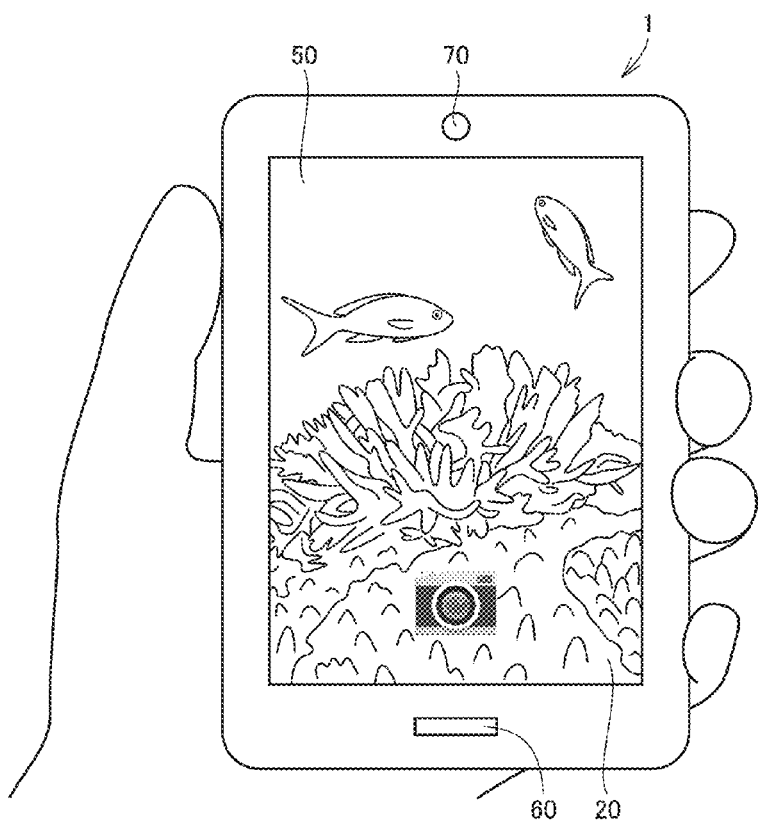
FIG. 2 is a front view of the smartphone which is the electronic device according to the first embodiment.

FIG. 2 is a front view of smartphone 1 which is the electronic device according to the first embodiment. As shown in FIG. 2, smartphone 1 includes a speaker 70 at a longitudinally upper position of a main body, a microphone 60 at a longitudinally lower position of the main body, as well as a display 20 and an input unit 50 at a central position. In FIG. 2, a subject whose image is to be captured underwater is being displayed on display 20.

Figure 3:
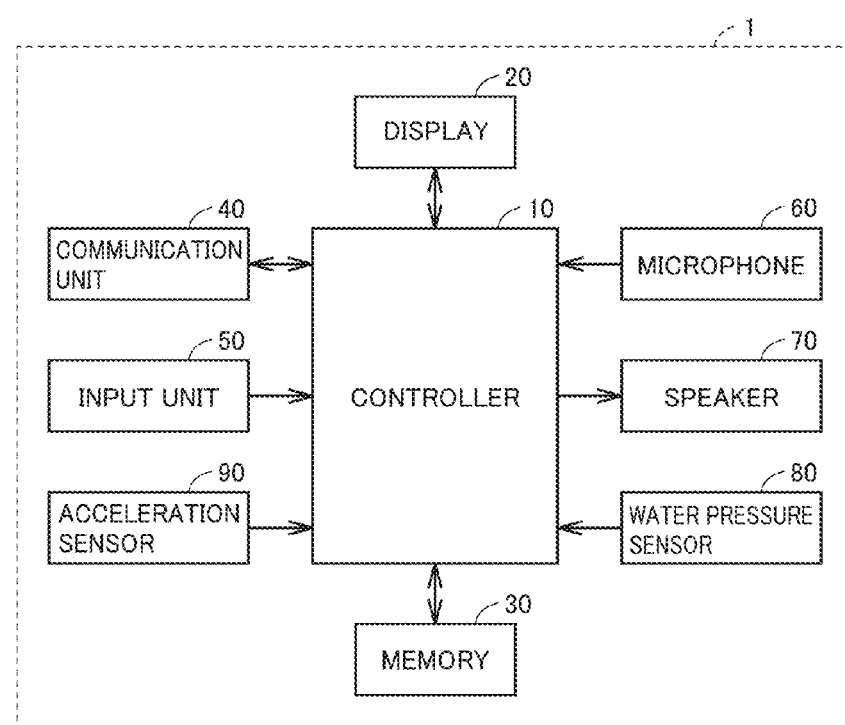
FIG. 3 is a block diagram for illustrating the functions of the smartphone shown in FIG. 2.

FIG. 3 is a block diagram for illustrating the functions of smartphone 1 shown in FIG. 2. As shown in FIG. 3, smartphone 1 includes a controller 10, display 20, a memory 30, a communication unit 40, input unit 50, microphone 60, speaker 70, a water pressure sensor 80, and an acceleration sensor 90.

Controller 10 can execute integrated control of smartphone 1. Controller 10 can control the respective components of smartphone 1 including display 20, memory 30, communication unit 40, input unit 50, microphone 60, speaker 70, water pressure sensor 80, and acceleration sensor 90. Although not shown, controller 10 includes at least one processor for providing control and processing capability to perform various functions as described in further detail below. In accordance with various embodiments, the at least one processor may be implemented as a single integrated circuit (IC) or as multiple communicatively coupled ICs and/or discrete circuits It is appreciated that the at least one processor 100 can be implemented in accordance with various known technologies. In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes. In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein. The at least one processor may include a CPU (Central Processing Unit), for example. The at least one processor may include a storage element. The storage element may include at least one of a SRAM (Static Random Access Memory) and a DRAM (Dynamic Random Access Memory), for example.

Display 20 can make a display based on a signal received from controller 10. Display 20 may be implemented by, for example, a liquid crystal display, a plasma display, or an organic electroluminescence display.

Memory 30 can store an OS (Operating System), programs of various applications, and various types of data used by the programs. The OS, the programs, and the various types of data can be read and executed by controller 10. Memory 30 may include, for example, a flash memory which is a non-volatile semiconductor memory or a HDD (Hard Disk Drive) which is a storage device.

Communication unit 40 includes an antenna switch, a duplexer, a power amplifier, a low noise amplifier, and a band pass filter, neither shown. Communication unit 40 can make communications over a communication network of a telecommunications carrier in accordance with the LTE (Long Term Evolution) or CDMA (Code Division Multiple Access) system. Communication unit 40 can process a signal received by the antenna, and can output the signal to controller 10. Controller 10 can output a signal to communication unit 40. Communication unit 40 can send the signal output from controller 10. Communication unit 40 includes a wireless LAN circuit and a wireless LAN antenna neither shown, and based on WiFi (registered trademark), can communicate with a WiFi-enabled apparatus such as, for example, a WiFi access point.

Input unit 50 can receive an input from a user, and can send a signal based on the input to controller 10. Input unit 50 may be implemented by at least one of buttons and a touch panel, for example. A user can make an input to an application through input unit 50.

Water pressure sensor 80 can measure the pressure exerted on smartphone 1, and can transmit measured data to controller 10. Controller 10 can determine that smartphone 1 is underwater when the pressure exerted on smartphone 1 exceeds a predetermined pressure based on the measured data received from water pressure sensor 80.

Acceleration sensor 90 can measure acceleration of smartphone 1 and can output measured data to controller 10. Acceleration sensor 90 can be mainly used to detect the movement of smartphone 1. For example, when smartphone 1 is rotated, acceleration sensor 90 can detect and transmit this movement to controller 10. Controller 10 can rotate the display of display 20 based on the measured data received from acceleration sensor 90.

If a user loses smartphone 1 during underwater use in a sea, river, lake, pool, or the like, smartphone 1 may be carried away by the water flow far away from the place where the user dropped smartphone 1 or may be sunk into the seabed, riverbed or the like. Then, it is generally more likely to be difficult to find smartphone 1 than in the case where it is lost on the ground. It may be desired that it becomes easier to find a smartphone when it has been lost underwater.

When smartphone 1 is lost, the orientation of smartphone 1 will not be changed for image capturing since smartphone 1 is out of a user's hand. When smartphone 1 is lost, the magnitude of acceleration thereof is limited to a certain range. If the state where the magnitude of acceleration of smartphone 1 remains in the certain range continues, it is highly likely that smartphone 1 has been lost. The magnitude of acceleration may be the magnitude of an absolute value of acceleration.

In smartphone 1 which is an electronic device according to the first embodiment, it is determined that smartphone 1 has been lost if the magnitude of acceleration of smartphone 1 is smaller than a predetermined threshold value for a predetermined time period.

In the first embodiment, it is determined whether or not smartphone 1 has been lost with an acceleration sensor conventionally included. According to smartphone 1, the manufacturing cost can be suppressed without the need for a new acceleration sensor.

Figure 4:
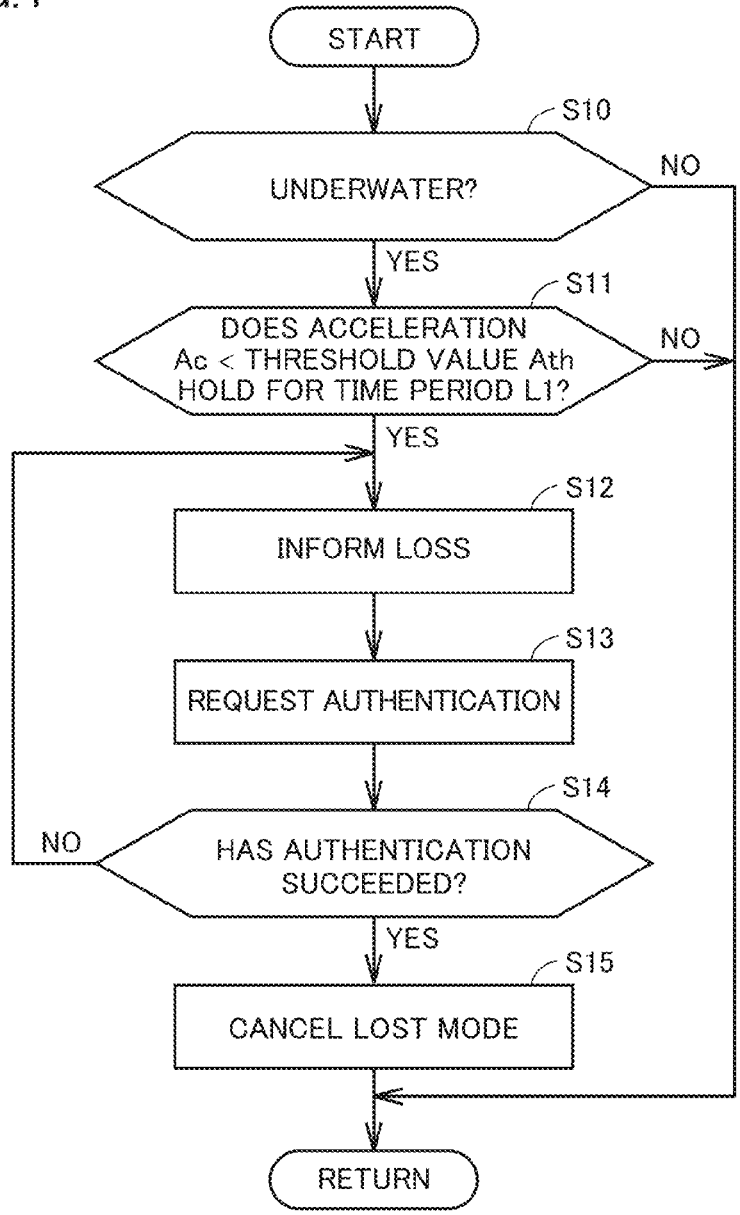
FIG. 4 is flowchart for illustrating the flow of a process of determining whether or not a smartphone has been lost, which is performed in a controller shown in FIG. 3.

FIG. 4 is flowchart for illustrating the flow of a process of determining whether or not the smartphone has been lost, which is performed in controller 10 shown in FIG. 3. The process shown in FIG. 4 is invoked by a main routine not shown for execution. As shown in FIG. 4, in step S10, controller 10 determines whether or not smartphone 1 is underwater based on measured data received from water pressure sensor 80. When smartphone 1 is not underwater (NO in S10), controller 10 returns the process to the main routine. When smartphone 1 is underwater (YES in S10), controller 10 proceeds the process to step S11.

In step S11, when there is a moment at which the magnitude of acceleration Ac of smartphone 1 has become more than or equal to a threshold value Ath for a time period L1 (NO in S11), controller 10 returns the process to the main routine. In step S11, controller 10 determines that smartphone 1 has been lost when the magnitude of acceleration Ac of smartphone 1 is smaller than threshold value Ath for time period L1 (YES in S11), and proceeds the process to step S12. In the first embodiment, the state of smartphone 1 after the determination that smartphone 1 has been lost will be referred to as a lost mode. The lost mode may be continued until a predetermined password is entered. This also applies to a second embodiment which will be described below.

In step S12, controller 10 informs that smartphone 1 has been lost to the surroundings by performing at least one of lamp flashing and production of a predetermined alarm sound, and proceeds the process to step S13. The lamp flashing and production of a predetermined alarm sound may be continued until the lost mode is canceled.

In the lost mode, controller 10 brings smartphone 1 into a locked state.

The locked state is a state where at least some of the functions of smartphone 1 are restricted. Even when user inputs are made via input unit 50, smartphone 1 brought into the locked state does not execute the functions based on some of the inputs, rather than executing the functions based on all the inputs. In this case, input unit 50 does not accept the some inputs, or even if controller 10 receives signals based on the some inputs from input unit 50, controller 10 does not execute the functions based on those inputs.

Smartphone 1 according to the first embodiment, even when brought into the locked state, can accept an input from a user for authentication, such as a password entry, for example.

In step S13, controller 10 requests authentication of a user via input unit 50 shown in FIG. 3, and proceeds the process to step S14.

In step S14, controller 10 determines whether or not the authentication requested of the user has succeeded. When the authentication has succeeded (YES in S14), controller 10 proceeds the process to step S15. In step S15, controller 10 cancels the lost mode, and returns the process to the main routine. When the authentication has not succeeded (NO in S14), controller 10 returns processing to step S12.

When input unit 50 includes a capacitive touch panel and an input from a user via the touch panel is required as an input for authentication, the user first needs to move smartphone 1 from under the water to above the water surface. This is because the capacitive touch panel does not operate underwater, and thus the user cannot cancel the lost mode underwater. When an input from a user via the touch panel is not necessary as an input for authentication, for example, when input unit 50 includes a button and the input for authentication is an input from a user via the button, the user can cancel the lost mode underwater. Also when input unit 50 includes a pressure-sensitive touch panel and the input for authentication is an input via the pressure-sensitive touch panel, the user can cancel the lost mode underwater.

In step S13, controller 10 may delete data stored by a user in memory 30. The data deleted in step S13 may include data stored by applications, such as, for example, a configuration file of an application, a log file or received e-mail.

The data stored by a user in memory 30 may be deleted anytime after step S12. For example, when the authentication has not succeeded (No in S14), controller 10 may delete the data stored by a user in memory 30. It may be desirable that time period L1 and threshold value Ath in step S11 be determined as appropriate by actual device experiments or simulations, for example.

The way of informing the loss in step S12 is not limited to lamp flashing and production of a predetermined alarm sound, but vibrations may be produced or a message saying that the smartphone has been lost may be transmitted to a predetermined address depending on a communication status, for example. The loss may be informed at a predetermined time interval in order to reduce power consumption. When the loss is not informed by the display on display 20, the intensity of the screen of display 20 may be darkened or turned off, in order to reduce power consumption.

Even if smartphone 1 is picked up by others, it is possible to prevent the others from operating smartphone 1 by requesting authentication of an input to smartphone 1 in step S13. By deleting the data stored by a user in memory 30 of FIG. 3, leakage of the data contained in memory 30 can be prevented, even if smartphone 1 is disassembled and memory 30 is taken out.

The request for authentication and deletion of data in step S13 may be performed immediately after the determination that smartphone 1 has been lost, or may be performed after the lapse of a predetermined time period after the determination that smartphone 1 has been lost. The deletion of data may be performed after the lapse of a predetermined time period after the request for authentication in step S13, or may be performed after the authentication fails a predetermined number of times.

Figure 5:
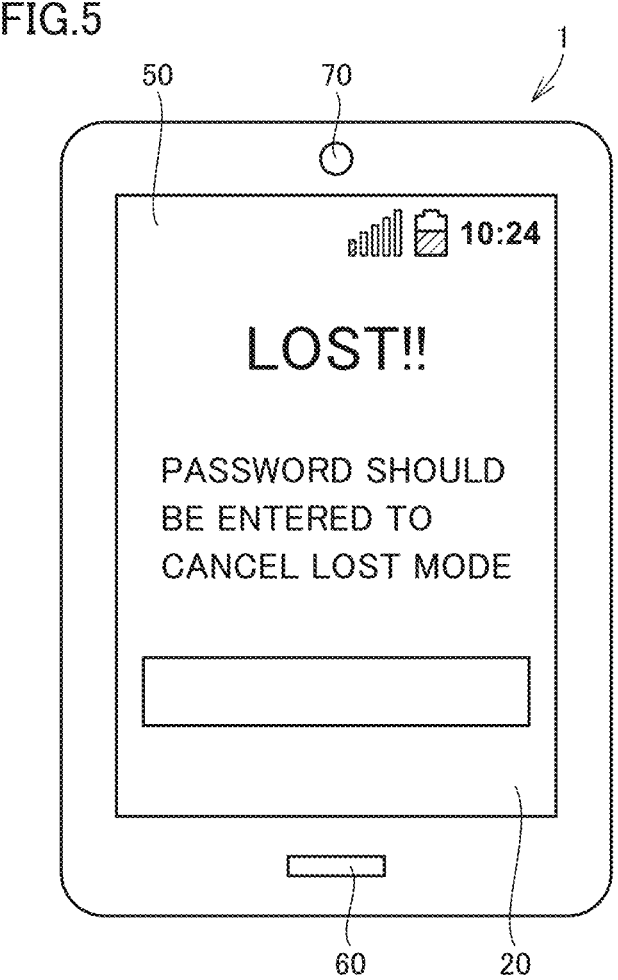
FIG. 5 shows a display when the controller shown in FIG. 3 determines that the smartphone has been lost.

FIG. 5 shows display 20 when controller 10 shown in FIG. 3 determines that the smartphone has been lost. As shown in FIG. 5, a message saying that smartphone 1 is in the lost mode is displayed on display 20. Authentication through a password is required of a user via input unit 50. When this authentication has succeeded, the lost mode is canceled, and the functions of smartphone 1 return to the normal condition. The authentication required of a user is not limited to authentication through a password. Other type of authentication may be adopted, and biometric authentication such as through a voiceprint, a fingerprint, an iris, or a vein, for example, may be adopted. The authentication may be based on a posture of smartphone 1, such as shaking smartphone 1 by a predetermined number of times or rotating it.

When smartphone 1 is in the lost mode and it is determined that smartphone 1 is not underwater based on measured data received from water pressure sensor 80, controller 10 may cause communication unit 40 to transmit the data stored by a user in memory 30 to a predetermined server. Controller 10 may delete the data mentioned above after transmission to a predetermined server in this way.

As described above, smartphone 1 which is an electronic device according to the first embodiment is capable of detecting by itself that it has been lost underwater. As a result, it becomes easy to make a user aware that smartphone 1 has been lost underwater.

Variation of First Embodiment

Figure 6:
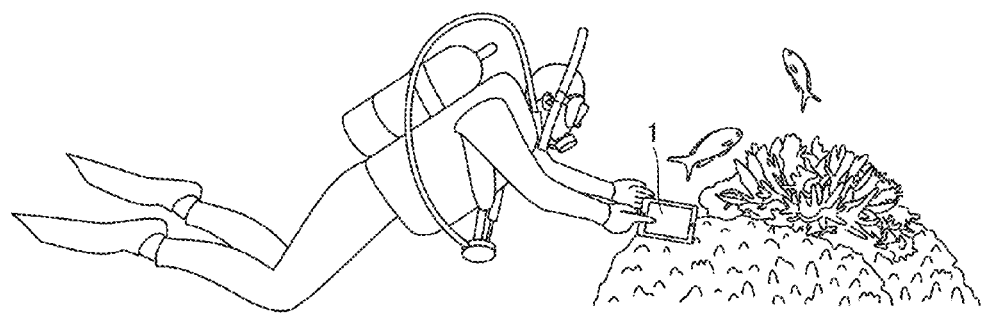
FIG. 6 shows a user taking a picture with a smartphone held stationary underwater.

The first embodiment describes the case in which, when controller 10 determines that the smartphone is underwater based on measured data received from water pressure sensor 80, the determination whether or not smartphone 1 has been lost is made all the time. As shown in FIG. 6, for example, image capturing may be performed in a state where a user places a smartphone underwater at a location such as a rocky area and holds it stationary, i.e., a state where the acceleration of the smartphone is limited to a certain range. If the smartphone transitions to the lost mode when such an image capturing mode is supposed, subsequent image capturing will be obstructed. It is desirable that a user be allowed to set the smartphone not to determine whether or not it has been lost even when it is determined that the smartphone is underwater. A variation of the first embodiment will describe a case where a user is allowed to set whether or not to determine whether or not the smartphone has been lost.

The variation of the first embodiment differs from the first embodiment in that a user is allowed to set whether or not to determine whether or not the smartphone has been lost. The remaining configuration will not be described repeatedly as it is similar to that of the first embodiment.

Figure 7:
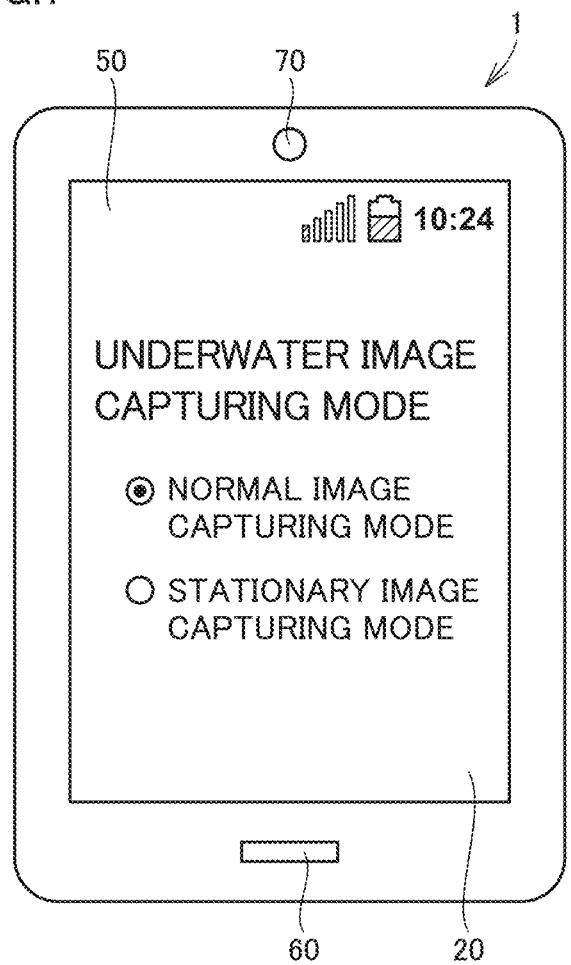
FIG. 7 shows a setting screen for an underwater image capturing mode displayed on a display of a smartphone which is an electronic device according to a variation of the first embodiment.

FIG. 7 shows a setting screen for an underwater image capturing mode displayed on display 20 of a smartphone 1A which is an electronic device according to a variation of the first embodiment. As shown in FIG. 7, in the variation of the first embodiment, a user is allowed to select a normal image capturing mode or a stationary image capturing mode by a predetermined operation for the underwater image capturing mode. The normal image capturing mode is an image capturing mode corresponding to a case where use of smartphone 1A kept stationary for time period L1 or longer is not supposed. The stationary image capturing mode is an image capturing mode corresponding to a case where use of smartphone 1A kept stationary for time period L1 or longer is supposed. In the normal image capturing mode, when it is determined that smartphone 1A is underwater, it is determined whether or not smartphone 1A has been lost, similarly to the first embodiment. In the stationary image capturing mode, it is not determined whether or not smartphone 1A has been lost even when it is determined that smartphone 1A is underwater.

As described above, the variation of the first embodiment offers similar effects to those of the first embodiment and also allows a user to set whether or not to determine whether or not the smartphone has been lost depending on the image capturing mode supposed to be performed underwater, so that underwater image capturing can be performed in various modes.

While either the normal image capturing mode or the stationary image capturing mode can be selected in the variation of the first embodiment, it may be made selectable only whether or not the smartphone has been lost.

In the above-described variation, in the stationary image capturing mode, whether or not smartphone 1A has been lost is not determined even when it is determined that smartphone 1A is underwater. Smartphone 1A may be configured such that a determination whether or not it has been lost is made when it is determined that smartphone 1A is underwater and such that the loss is not informed in the stationary image capturing mode.

Second Embodiment

The first embodiment describes the configuration in which it is determined that the smartphone has been lost when the magnitude of acceleration of the smartphone is smaller than a predetermined threshold value for a predetermined time period. The condition for determining that the smartphone has been lost is not limited to that of the first embodiment. A second embodiment describes a case where the condition for determining that a smartphone has been lost differs from that of the first embodiment.

When a smartphone is lost, there will be no user input to the smartphone since the smartphone is out of a user's hand. In the second embodiment, a condition that there is no user input for a predetermined time period is added to the condition for determining that the smartphone has been lost in the first embodiment.

The second embodiment differs from the first embodiment by the condition for determining that the smartphone has been lost, i.e., step S21 shown in FIG. 8. In the second embodiment, step S11 shown in FIG. 4 of the first embodiment is replaced by step S21 shown in FIG. 8. The remaining configuration will not be described repeatedly as it is similar to that of the first embodiment.

FIG. 8 is flowchart for illustrating the flow of a process of determining whether or not a smartphone which is an electronic device according to the second embodiment has been lost, which is performed in controller 10 of the smartphone. As shown in FIG. 8, when it is determined in step S10 that the smartphone is underwater, then in step S21, controller 10 returns the process to the main routine when there is a moment at which the magnitude of acceleration Ac of the smartphone has become more than or equal to threshold value Ath for time period L1 or when an input has been made to the smartphone for time period L1 (YES in S21). In step S21, when the magnitude of acceleration Ac of the smartphone is smaller than threshold value Ath for time period L1 and when no input has been made to the smartphone (NO in S21), controller 10 determines that the smartphone has been lost, and proceeds the process to step S12. Controller 10 performs similar processing to that of the first embodiment.

As described above, with the smartphone which is an electronic device according to the second embodiment, the condition that there is no input to the smartphone for a predetermined time period is added to the condition for determining that the smartphone has been lost in the first embodiment, so that underwater loss can be detected more correctly. As a result, it becomes easy to make a user aware that the smartphone has been lost underwater in a more proper timing.

The way of determining whether or not the smartphone has been lost is not limited to those described in the first and second embodiments. For example, the condition for determining that the smartphone has been lost may only be the condition that there is no input to the smartphone for a predetermined time period. Alternatively, whether or not the smartphone has been lost may be determined through use of a grip sensor depending on whether or not the state where the smartphone is not held by a user continues for a predetermined time period. The orientation of the smartphone or an image captured automatically may be analyzed and a determination may be made. For example, it may be determined that the smartphone has been lost when, for time period L1, the magnitude of acceleration Ac of the smartphone is smaller than threshold value Ath, and the smartphone is inclined by more than or equal to a predetermined inclination, or when an image captured automatically is pitch black and nothing appears in the image. This is because when the smartphone is inclined by more than or equal to a predetermined inclination for time period L1 or when an image captured automatically is pitch black and nothing appears in the image, it is difficult to suppose that a user is capturing an image normally.

The loss of a smartphone may be determined on at least one of the following conditions (1) to (6) or combining two or more of them:

(1) whether or not the magnitude of acceleration Ac is more than or equal to threshold value Ath for time period L1;

(2) whether or not any input to the smartphone has been made for time period L1;

(3) whether or not the state where the smartphone is not held by a user continues for time period L1;

(4) whether or not the smartphone is inclined by more than or equal to a predetermined inclination for time period L1;

(5) the result of analyzing an image captured with the smartphone; and (6) whether or not the smartphone is located at a position deeper than a predetermined depth.

As to the conditions (1) to (4), time period L1 may be the same or may be different. As to the condition (6), utilizing the fact that the water pressure increases as the depth of water becomes deeper, for example, it may be detected that the smartphone is located at a position deeper than the predetermined depth when the water pressure becomes larger than a predetermined pressure.

The water pressure sensor is not a limitation, but the capacitive touch panel included in input unit 50 may be used to determine whether or not the smartphone is underwater. In this case, it may be detected whether or not the whole surface or more than a predetermined area of the touch panel is touched, and when the whole surface or more than a predetermined area is touched, it may be determined that the smartphone is underwater.

When it is determined that smartphone 1 has been lost, controller 10 does not necessarily need to bring smartphone 1 into the locked state, but it may be possible to start up any application even in the lost mode, similarly to the normal case. In that case, even in the lost mode, the lost mode may be canceled by a predetermined operation, and the camera application or the like may be started up for image capturing.

The respective embodiments disclosed herein are intended to be combined as appropriate and practiced. Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An electronic device comprising:
  an underwater detection unit comprising at least one of a pressure sensor and a capacitive touch panel, the underwater detection unit configured to detect whether or not the electronic device is underwater;
  an acceleration sensor configured to measure a magnitude of acceleration of the electronic device; and
  at least one processor configured to
    perform loss detection by
      determining that the electronic device has been lost in response to a condition that both the underwater detection unit detects that the electronic device is underwater and the acceleration sensor detects that the magnitude of acceleration of the electronic device has not exceeded a predetermined threshold value over a predetermined time period, and,
when the electronic device is determined to have been lost, switching the electronic device to a lost mode in which at least one alert is emitted from the electronic device, the at least one alert comprising at least one of a visual alert, an audio alert, a vibration alert, and a text message alert, and
prevent performance of the loss detection in response to a user selection of a stationary image-capturing mode.

2. The electronic device according to claim 1, wherein the condition further comprises that no user input has been received by the electronic device over the predetermined time period.

3. The electronic device according to claim 1, further comprising a memory, wherein the at least one processor is configured to delete predetermined data stored in the memory when it is determined that the electronic device has been lost.

4. The electronic device according to claim 3, wherein the predetermined data is data stored by a user.

5. The electronic device according to claim 1, wherein the at least one processor is configured to, in the lost mode, restrict access to data stored in the electronic device until a user is authenticated.

* * * * *